(No Model.) 2 Sheets—Sheet 1.
L. PELATAN & F. CLERICI.
PROCESS OF EXTRACTING GOLD AND SILVER FROM THEIR ORES.
No. 567,503. Patented Sept. 8, 1896.
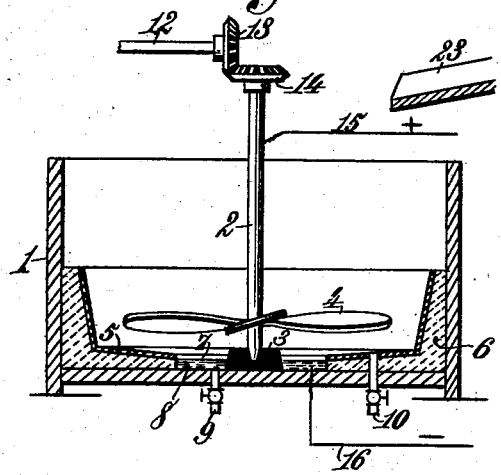
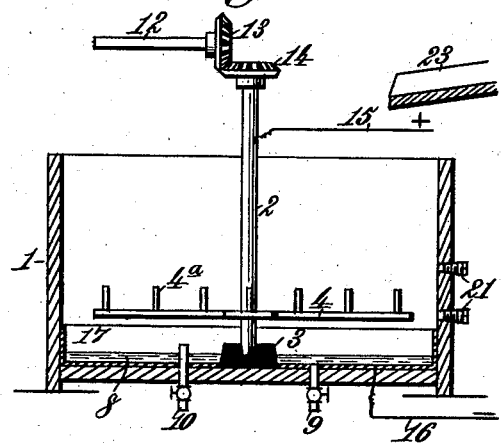
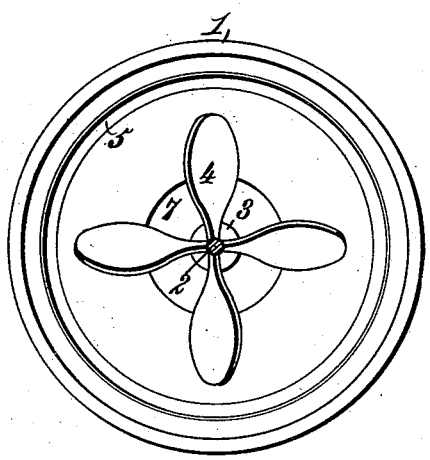
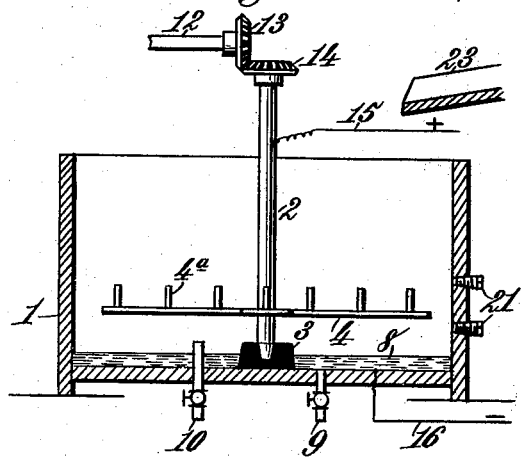
Witnesses.
Robert Everett
Thos. A. Gunn
Inventors.
Louis Pelatan
Fabrizio Clerici.
By James L. Norris.
Atty.

(No Model.) 2 Sheets—Sheet 2.
L. PELATAN & F. CLERICI.
PROCESS OF EXTRACTING GOLD AND SILVER FROM THEIR ORES.
No. 567,503. Patented Sept. 8, 1896.
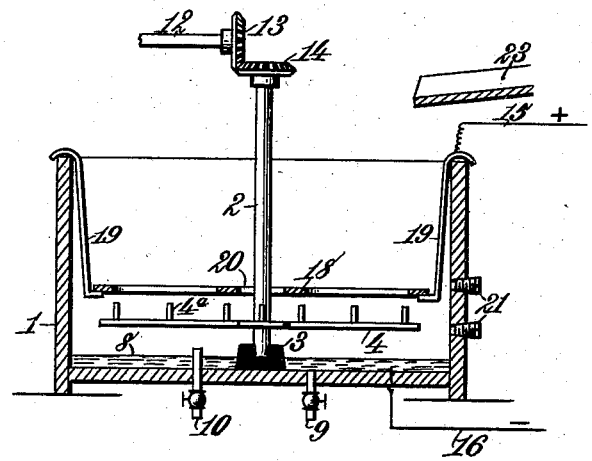
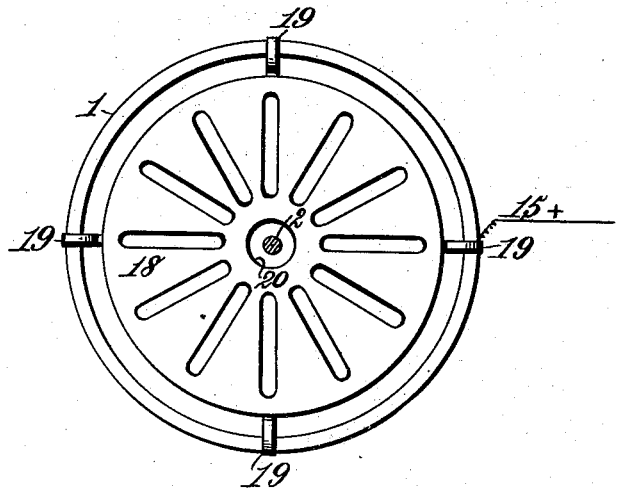
Witnesses:
Robert Everett
Thos. A. Green
Inventors:
Louis Pelatan,
Fabrizio Clerici
By James L. Norris.
Atty.

UNITED STATES PATENT OFFICE.

LOUIS PELATAN, OF PARIS, FRANCE, AND FABRIZIO CLERICI, OF MILAN, ITALY.

PROCESS OF EXTRACTING GOLD AND SILVER FROM THEIR ORES.

SPECIFICATION forming part of Letters Patent No. 567,503, dated September 8, 1896.

Application filed January 10, 1896. Serial No. 575,012. (No specimens.)

*To all whom it may concern:*

Be it known that we, LOUIS PELATAN, a citizen of the Republic of France, residing at Paris, France, and FABRIZIO CLERICI, a subject of the King of Italy, residing at Milan, Italy, have invented new and useful Improvements in Extraction of Gold and Silver from their Ores, of which the following is a specification.

Our invention relates to the extraction of gold and silver from their ores, our purpose being to simplify the process described in United States Letters Patent granted to us upon the 23d day of October, 1894, No. 528,023. It is our purpose to provide a process for the treatment of gold and silver bearing ores in which the precious metals may be extracted by a single continuous operation which is carried out to completion in one and the same apparatus, thereby avoiding the necessity of using either filters or means for precipitating the precious metals out of the solution formed dissolving them out of the ore. It is our purpose also to provide a process for the separation of gold and silver from their ores by the action of a suitable solvent solution, the conductivity of which is increased by the addition of a soluble salt of an electropositive metal, the solvent action of the solution being intensified by a weak current of electricity, and the precious metals being deposited upon or amalgamated with a suitable cathode, the whole being accomplished by a continuous operation carried out in one and the same apparatus.

The invention consists, to these ends, in the process hereinafter fully set forth, and then particularly pointed out in the claims.

To enable those skilled in the art to which our invention pertains to fully understand and to make and use the same, we will describe said invention in detail, reference being had for this purpose to the accompanying drawings, in which—

Figure 1 is a central vertical section showing one form of apparatus suitable for the practice of our invention. Fig. 2 is a similar view showing a modified construction. Fig. 3 is a plan view of the parts shown in Fig. 1. Fig. 4 is a central vertical section of the apparatus, showing a further modification. Fig. 5 is a similar section showing a modified form of the anode. Fig. 6 is a plan view of the parts shown in Fig. 5.

The reference-numeral 1 in said drawings indicates a vat or tank, which will be referred to hereinafter as a "pan," as our invention is, in many respects, closely analogous to the panning methods used in the treatment of the gold and silver ores. The pan 1 is preferably of circular form and constructed of wood or other suitable material. Within it is arranged a central shaft 2, stepped upon an insulating-bearing 3 in the bottom and provided with radial agitating arms or blades 4, the latter being either straight or curved to resemble the blades upon a propeller, whereby a constant circulation, as well as agitation, of the contents of the pan is produced. The shaft 2 and agitator 4 are either formed of or covered with a metal, as, for example, zinc or steel, either of which is electropositive relatively to an amalgamated plate or plates 5, which partly cover the bottom of the pan and may extend over part of the inner surface of its cylindrical wall, in which case we prefer to support the metal plates upon a base 6 of cement. Surrounding the central bearing 3 and between the same and the edge of the cement base is an annular well 7, which is filled with mercury, the latter being denoted by the reference-numeral 8. A tap 9 is provided in the bottom of the well 7 by which the mercury may be drawn off. A separate outlet 10 for the sludge is also provided at any suitable point.

The shaft 2 is revolved by any suitable means, such as a horizontal shaft 12, having a bevel-gear 13, meshing with a bevel-gear 14 on the shaft 2. The latter is connected by a wire 15 to one of the poles of a generator of electricity, and a wire 16 connects the other pole to the mercury in the well 7, or to the amalgamated plates 5, or to both. In all cases the distance between the bottom and the agitating-arms must be regulated so as to render it impossible for any short circuit, which would prevent the process to follow its regular course.

As equivalents of the parts described we may use a pan constructed of wood and provided with a shallow basin 17, of amalgamated copper or silver, lying in the bottom of the pan and closely surrounding the insulating-bearing 3, the bottom of said basin being covered by a thin layer of mercury. Instead of forming the agitator in the manner already described, we may make the radial arms perfectly straight, providing them with fingers 4ª, as shown in Figs. 2, 4, and 5. This construction we find preferable, in some respects, when we employ a cathode or negative pole consisting of a thin layer of mercury. We may also use an anode consisting of a metallic frame 18, having an outline similar to that of the pan, in which it is suspended by suitable clips 19. An opening 20 is formed in the center for the shaft 2 of the agitator, the radial arms of which are provided with stirring-fingers 4ª to give the necessary degree of agitation. In this form the agitator will be of non-conducting material, and it will operate between the anode and the bottom of the pan. In the form of apparatus shown in Figs. 2, 4, and 5 taps 21 are provided in the side wall of the tank for the discharge of the tailings and solution, and a tap 10 in the bottom, rising above the surface of the mercury, serves to withdraw the sludge, this, as well as the outlet for the mercury, being similar to that already described.

In the treatment of ores of the precious metals raw ores will usually be treated by a cyanid solution. When the cyanid solution is employed upon raw ores, a solution of potassium cyanid is placed in the pan, its strength being not far from one-tenth of one per cent. In order to impart the necessary conductivity to this solution, in an electric sense, we add thereto a salt of sodium, preferably the chlorid or common salt, until the said solution acquires a strength of from one to two per cent., or thereabout. The solution is modified by the addition of the chlorid or other salt of sodium in such proportions as may be made necessary by the circumstances of each case, in order to produce in the solution the required degree of electric conductivity. The solution being thus prepared and the agitator being set in motion, a carefully-regulated weak current of electricity, from any suitable source, is caused to flow from the anode to the cathode, its potential not exceeding three volts, which is below the point at which decomposition of the sodium chlorid would take place, so that the latter remains in the solution practically unchanged. The dissolution of the metals in the ore begins at once, and the process is continued for a few hours until completed. The action of the electric current not only intensifies the solvent action, but produces an electrodeposition of the metal out of the solution and into the mercury, or upon the amalgamated plates of copper, which may constitute the negative element or cathode.

Our process has the great advantage of allowing particles of gold, which frequently are to be found in the ores and which are too coarse to be easily and quickly dissolved, to be directly amalgamated as they are brought by the simple effect of gravitation in contact with the amalgamated plates or mercury at the bottom of the pan, the same being always kept bright and active by the action of the electric current, this reaction being similar to the electrodeposition which takes place in plating with the precious metals.

In all forms of this apparatus in which the agitator or the agitator and shaft constitute the anode a proper space must be allowed between the radial arms 4 and the metal of the cathode, in order to prevent the current from passing directly or by the shortest path from one to the other, thereby preventing it from acting in the desired manner upon all parts of the solution.

The entire process of extracting the precious metals, separating them from the solution, and collecting the same is by our invention carried out in one and the same pan by a practically continuous process, and the simplicity of construction and the reduction in the labor of handling and treating the ores gives to our invention a marked advantage in point of economy, both in the initial cost of the plant and the force and material required in operating the same.

By our invention we are able also to treat those ores in which the gangue is composed of or contains so large a percentage of talcose, clay, or other earthy or mineral constituents as to prevent the leaching or filtering of the solutions through them, which has been a serious difficulty to the treatment of such ores. All these ores, however, yield readily to the process hereinbefore described, and the valuable metals are separated without difficulty and without material loss. The final step in our process consists in washing the sludge and waste products out of the pan by a stream of pure water, which is introduced by a trough or pipe 23, leaving only the amalgam or the electrically-coated cathode.

The process described requires a period varying according to the nature of the ore, and after one or more of such operations the mercury in the bottom of the pan is drawn off or the amalgamated plates are cleaned, according to the form of cathode used. The amalgam is separated and retorted in the ordinary way employed for the extraction of the gold and silver, either in the process of pan-amalgamation or in any other amalgamating process.

Heretofore and prior to our invention it has been proposed to treat floured mercury in an electrolytic bath of water to which a portion of salt solution or sulfuric acid is added to overcome a certain amount of resistance to the electrical current which is developed in the water.

In separating metals from their ores it has also been proposed to grind the ores, mixed with mercury, to a pulp and treat this pulp by a current of electricity, chlorid of sodium being intermixed with the saturated ore for the purpose of utilizing the chlorin given off, while the sodium unites with the mercury to form sodium amalgam, which destroys any base coverings on the metals and assists in the precipitation and aggregation of the values. In both the processes referred to the mercury is mixed with the ores intimately, so as to amalgamate while grinding, and in one of said processes the solution is drawn off into a separate vessel in which the separation takes place. Neither proposes to use a comparatively weak solution, the solvent power of which is intensified by a weak current of electricity, which is enabled to act by reason of the increased conductivity of the solution due to the addition of sodium chlorid to the latter.

We make no claim to a process in which sodium is used for the purpose and in the manner proposed by prior inventors. Our invention consists, in this respect, in the use of a comparatively weak solution, the solvent power of which is intensified by the action of a weak electric current which is driven from a revolving anode through the solution, the latter being rendered sufficiently conductive for the purpose by the addition of a soluble salt of an electropositive metal, such as chlorid of sodium.

It is well known that in electrolytic processes for the electrodeposition of gold and silver the quantity or amperage of the electric current will depend upon the weight of gold and silver present. It is a fact, nevertheless, that by our present invention we so increase the conductivity of the solution by the addition of sodium chlorid, which remains practically undecomposed in the solution, that the current employed is enabled to flow from the anode to the cathode under a phenomenally low tension as compared with prior processes.

With regard to the sodium chlorid acting as a conductor in the solution without decomposition, we refer to the authority of Meyer's *Modern Theories of Chemistry*, fifth edition, page 533, section 285, which states: "Compounds may be divided into three classes: (1) conductors of the first class; (2) conductors of the second class or electrolytes; (3) non-conductors." * * * "One and the same body in different physical conditions may belong to different classes." * * * "The question still remains undecided whether one and the same body can be an electrolyte and a conductor of the first class." "Compounds of conductors and non-conductors are found in each of the three classes."

Meyer's article on electrolytes makes no mention of sodium chlorid, and he shows clearly that there are good and strong reasons for doubting the assertion that this compound and others are unable to become conductors of the first class. Our invention has demonstrated that under the circumstances stated in this specification sodium chlorid can be utilized as a conductor of the first class described by Meyer. As a confirmation of this statement we may mention that in practicing our invention upon a commercial scale we have invariably found that upon the addition of sodium chlorid to the solution during the passage of a current having the potential stated the marked variation of the voltmeter which immediately follows shows conclusively that less pressure is required in order to push the current through from the anode to the cathode, the increased conductivity of the solution being thus very clearly evidenced. Moreover, the diminished voltage shown by the meter remains substantially unchanged, which would not be the case if the sodium and chlorid were dissociated. It is evident, therefore, that a potential not exceeding three volts cannot produce decomposition of the sodium chlorid, and in practicing the process we have found this to be true.

What we claim as our invention is—

1. The process described for the solution and recovery of gold and silver from their ores, by a single, continuous operation, said process consisting in submitting the said ores to the action of a comparatively weak cyanid solution, rapidly revolving an anode in the solution over a fixed cathode passing a current of electricity from the anode to the cathode, adding sodium chlorid to the solution to enable a current of low electromotive force to flow from the anode to the cathode, maintaining the potential of the current below the point at which electrodecomposition of sodium chlorid takes place, and retaining the sodium chlorid in solution unchanged, substantially as described.

2. The process described, the same consisting in treating the ores of gold and silver with a comparatively weak cyanid solution, adding sodium chlorid to said solution, intensifying the solvent activity of said solution by passing an electric current through the same from a rapidly-revolving anode to a fixed cathode, maintaining the electromotive force of the current below the point at which electrodecomposition of the sodium chlorid takes place, and collecting the precious metals from said solution by electrodeposition upon a cathode of amalgamated plates and mercury, substantially as described.

3. The process described which consists in submitting the ores of gold and silver to the action of a comparatively weak cyanid solution containing chlorid of sodium, intensifying the solvent power of the solution by the passage of a continuous electric current having an electromotive force below that required for the decomposition of sodium chlorid, and continuously revolving the anode from which the current is supplied to the solution over a mercury cathode, substantially as described.

In testimony whereof we have hereunto set our hands in presence of two subscribing witnesses.

LOUIS PELATAN.
FABRIZIO CLERICI.

Witnesses:
E. DE LILLO,
F. BARBAE.